No. 740,034. Patented September 29, 1903.

UNITED STATES PATENT OFFICE.

JOB THOMAS NIBLETT, OF GREENWICH, LONDON, ENGLAND.

STORAGE BATTERY.

SPECIFICATION forming part of Letters Patent No. 740,034, dated September 29, 1903.

Application filed August 8, 1902. Serial No. 118,960. (No model.)

*To all whom it may concern:*

Be it known that I, JOB THOMAS NIBLETT, electrical engineer, a subject of the King of Great Britain, residing at Greenwich, London, England, have invented certain new and useful Improvements in or Relating to Storage and other Batteries, of which the following is a specification.

This invention relates chiefly to secondary or storage batteries, and has reference more particularly to the employment in such batteries of the material known as "kieselguhr" or "infusorial" earth, the highly-absorbent nature of which, as well as its power of resisting the action of acids, is well known.

The invention is designed to improve both the active material or coating of the plates and also the porous or absorbent separators, blocks, or plates which are commonly interposed between the electrodes. This is accomplished by incorporating with such active materials and also with the materials from which the said separators or blocks are made a certain proportion of infusorial earth, whereby great porosity both in the active material and the separators is attained, and hence the improved cells are capable of very high rates of charge and discharge, while they can, if desired, be made practically into what are known as "dry" or "afluidic" cells.

In applying the invention to primary batteries a plate of the aforesaid active material mixed with kieselguhr can be used in conjunction with a plate or plates of zinc or other suitable metal.

In carrying out the invention the electrodes, which need not have the usual grid or support, are formed of lead oxids or other compounds and of kieselguhr, which are suitably compressed or molded so that they form coherent plates analogous to the well-known lithanode plates. The active material in the above may consist of ordinary lead oxids mixed with electrolyzed lead or lead compounds which have been electrolytically prepared, or which have been so prepared that they are analogous to electrolytic compounds. Owing to this, physical changes in the plate while in use are less likely to occur, and the active material is also rendered conductive by the presence of the electrolytic materials. The active material thus mixed with kieselguhr possesses a great degree of permeability as distinguished from the actual porosity found in some types of plate at present constructed. In other words, while the active material made up according to my invention is to the eye apparently homogeneous and compact, yet it is in its nature permeable to a high degree by the electrolyte and is in no way dense and resistant to the solution like ordinary active material. This result is due to the presence of the kieselguhr, of which all the fibers or particles act as minute ducts to convey the electrolyte thoroughly into the body of the material by capillary attraction. It is superior to what is ordinarily known as "porosity," which is due simply to small holes in the material, because these holes soon get closed up by sulfate or by the swelling of the active materials. Owing to its being permeable in this way, the material can be formed in very much less time than is usually required, and the capacity of the cells made with plates of the same is very great, since practically the whole mass of the material is in action at the same time and not simply the outer layer or face of the plate.

The proportion of kieselguhr may, for example, be one to five per cent. for the positive-pole plate and two and one-half for the negative-pole plate; but this may be varied and is greater the thicker the plates or blocks are required to be.

The electrolyzed portion of the active material may be previously prepared from a plastic mass consisting of lead oxids or compounds made into a paste with sulfuric acid. This mass is placed in lead trays or the like and subjected to electrolytic treatment analogous to that of "forming." It is then discharged slowly in any convenient way, which causes it to assume a crystalline form very advantageous for use in the subsequent stages. The mass is then dried and pulverized and mixed with the untreated lead oxids or compounds—say in the proportion of one to two—and the necessary proportion of kieselghur is added at the same time, the whole being made into a paste with sulfate of ammonia, sulfuric acid, or other medium which will tend to form insoluble or partly-insoluble compounds and so promote the setting. The mass is then filled into the grid or support or is molded under pressure or otherwise to the desired shape in cases where it is to be used in the form of plates or slabs only.

I have found in some cases that the active material gives very good results if only the ordinary lead compounds are used—that is to say, the electrolyzed portion of the mixture may be omitted, if desired. This greatly simplifies the manufacture, while the porosity imparted by the kieselguhr is sufficient to accommodate any swelling or physical change that may occur among the molecules of the active material during the charging and discharging of the cell. For instance, very satisfactory plate may be made up of about equal parts of litharge and red lead mixed with two and one-half per cent. of kieselguhr and then molded to the desired shape.

The above description relates to the mode of manufacturing the plates or electrodes of my improved cells.

I will now proceed to describe the manufacture of the improved porous absorbent separating-plate previously referred to. This is formed wholly or principally of kieselguhr wetted, for instance, with sodium silicate and formed by molding or compression into thin sheets or slabs, which are burned to render them hard and firm without impairing their porosity. In some cases it may be mixed into a paste with china-clay and water instead of sodium silicate and be then molded and burned. To further increase the porosity, if desirable, powdered charcoal, coke, or coal may be incorporated with the mass. These materials will be burned out during the kilning and leave behind corresponding cavities in the plate.

The product may be used as a separator for the electrode in the ordinary way or may be interposed between them to serve as a medium for holding the electrolyte when it is desired to made the battery up as a block or pile in the most compact form after the manner of so-called "dry" batteries.

What I claim, and desire to secure by Letters Patent of the United States, is—

1. A battery having its plates composed of a mixture of lead oxids prepared in the ordinary way, electrolyzed lead compounds, and kieselguhr, substantially as described.

2. A battery having its plates composed of lead oxid, electrolytic lead oxid, and kieselguhr, substantially as described.

3. A battery having its plates composed of electrolyzed active material and active material which has not been electrolyzed, incorporated with kieselguhr, substantially as described.

4. A battery having the active material of the positive-pole plates incorporated with a higher percentage of kieselguhr than the negative-pole plates, substantially as described.

5. A battery having the active material of its positive-pole plates incorporated with five per cent. of kieselguhr, and that of its negative-pole plates incorporated with two and one-half per cent. of kieselguhr, substantially as described.

6. A battery having its plates composed only of a molded mixture of lead oxids, incorporated with kieselguhr to impart permeability thereto.

In testimony whereof I have hereunto set my hand, in presence of two subscribing witnesses, this 25th day of July, 1902.

JOB THOMAS NIBLETT.

Witnesses:
C. BARNARD BURDON,
T. J. OSMAN.